No. 766,995. PATENTED AUG. 9, 1904.
F. P. GORIN.
CHRONOLOGICAL MONITOR FOR USE WITH COIN CONTROLLED OR OTHER MACHINES.
APPLICATION FILED SEPT. 30, 1903.
NO MODEL.
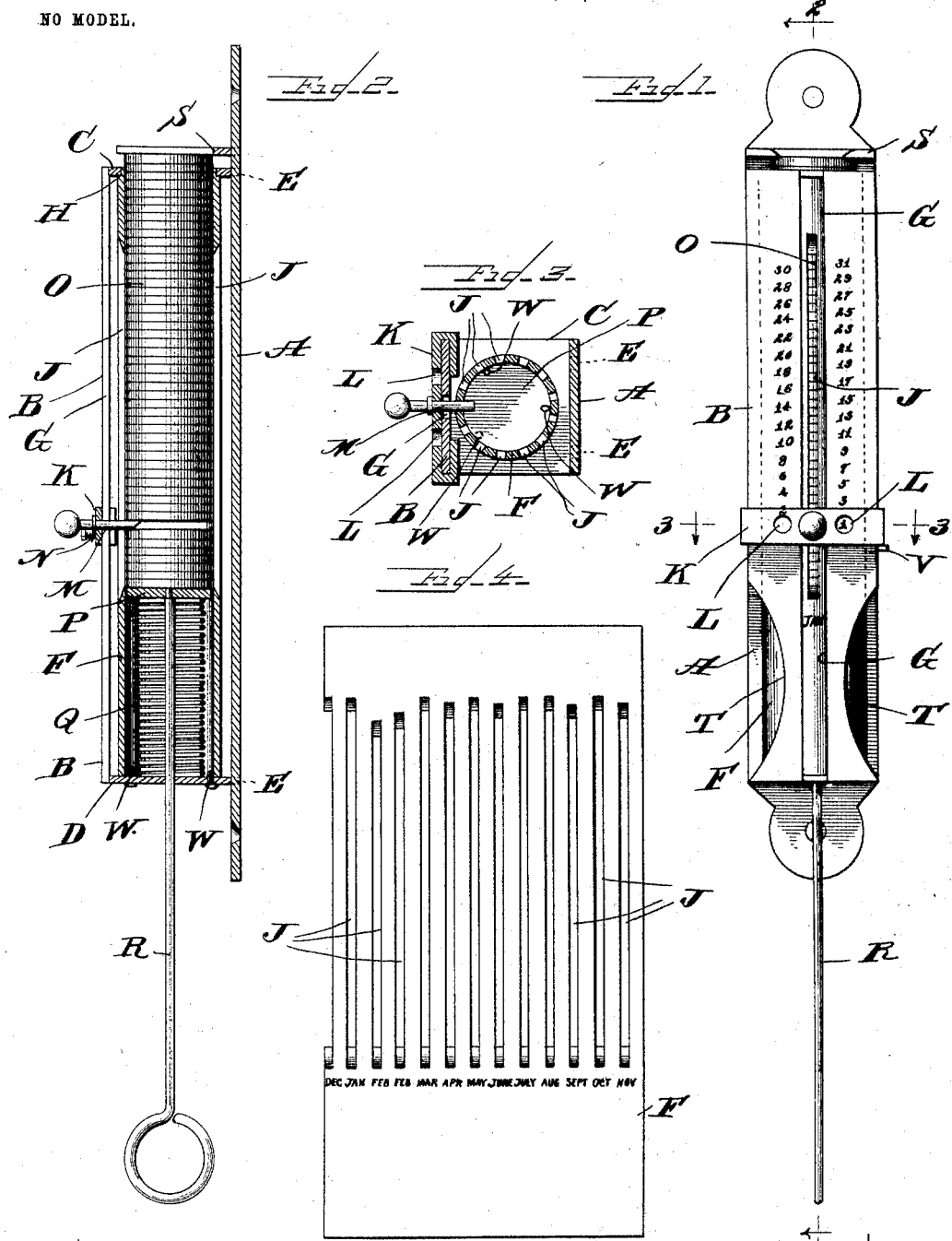
Witnesses
G. A. Naubenschmidt
Chas. H. Seem
Inventor
Fred P. Gorin
By Brown & Darby
Attys.

No. 766,995. Patented August 9, 1904.

UNITED STATES PATENT OFFICE.

FRED P. GORIN, OF CHICAGO, ILLINOIS.

CHRONOLOGICAL MONITOR FOR USE WITH COIN-CONTROLLED OR OTHER MACHINES.

SPECIFICATION forming part of Letters Patent No. 766,995, dated August 9, 1904.

Application filed September 30, 1903. Serial No. 175,146. (No model.)

*To all whom it may concern:*

Be it known that I, FRED P. GORIN, a citizen of the United States, residing at Chicago, in the county of Cook and State of Illinois, have invented a new and useful Chronological Monitor for Use in Connection with Coin-Controlled Machines and for other Purposes, of which the following is a specification.

This invention relates to a chronological monitor for use in connection with coin-controlled machines and for other purposes.

In many forms of coin-controlled apparatus—such, for instance, as residence or business telephones—it is a common practice to rent the machines subject to the payment of a minimum amount of toll for a given period of time. For instance, in the case of telephones the desired circuit connections are made upon the deposit of a coin, such as a five-cent piece or a ten-cent piece or other token, the telephone company collecting the coins or tokens so deposited periodically—say once each month—on which occasions the coins or tokens deposited during the preceding period must at least equal the minimum amount of the toll or rental charges for the use of the telephone. It frequently happens that a subscriber has not used the telephone or deposited coins or tokens to the extent of the minimum required within the given period. The difference is required to be made up in cash by the subscriber. It also frequently happens that the subscriber keeps no record of the number of times the instrument is used, and consequently deposits coins or tokens in greater amount than is required for the minimum, the excess going to the telephone company. It is a source of annoyance and trouble to attempt to keep an accurate record of the number of times the telephone has been used within the given period, and consequently a subscriber at the end of the period and without any accurate record being kept is liable to be called on to make up in cash the difference between the amount of coins or tokens deposited and the minimum amount required, whereas he might have used the telephone a greater number of times during the period if he had known that the number of coins or tokens deposited was below the minimum amount required. On the other hand, without a record being kept the subscriber is liable to use the telephone more lavishly than is necessary, and hence deposit a greater number of coins or tokens than is necessary to make up the minimum amount required.

It is among the special purposes of my present invention to provide an apparatus which is simple in construction and efficient in operation for indicating at a glance to a subscriber to a telephone, for instance, the number of coins or tokens necessary to be used within the given period in order to enable the minimum amount of the toll or rental to be paid by him at the end of the period, thereby enabling the subscriber to get the greatest amount of benefit from the use and enjoyment of the telephone for the minimum amount of rental or toll paid.

Other objects and purposes of the invention will appear more fully hereinafter.

The invention consists, substantially, in the construction, combination, location, and arrangement of parts, all as will be more fully hereinafter set forth, as shown in the accompanying drawings, and finally pointed out in the appended claims.

Referring to the accompanying drawings and to the various views and reference-signs appearing thereon, Figure 1 is a view in front elevation of a form of apparatus embodying the principles of my invention. Fig. 2 is a longitudinal central section of the same on the line 2 2 of Fig. 1 looking in the direction of the arrows. Fig. 3 is a transverse section on the line 3 3, Fig. 1, looking in the direction of the arrows. Fig. 4 is a view illustrating a development of the surface of the cylindrical tube or casing employed in connection with the principles of my invention.

The same part is designated by the same reference-sign wherever it occurs throughout the several views.

Reference-sign A designates a supporting or base plate of suitable construction and arrangement for facilitating the attachment of the device to a wall or other convenient support and designed to be placed in position ir convenient relation with respect to the telephone or other apparatus in connection with which the device is to be employed.

B designates a front plate having angularly-turned ends C D, adapted to be secured or attached to the base-plate A in any suitable or convenient manner, as, for instance, by means of the tenons E, (indicated in dotted lines in Figs. 2 and 3,) thereby forming a receptacle to receive a cylindrical casing F. The front plate B is provided with a longitudinal slot or opening G throughout the length thereof, and the angularly-turned end C is provided with a circular opening to receive one end of the cylindrical casing F to form a journal-bearing for such cylindrical casing. As shown and preferably, the end of the cylindrical casing F, which is received in the opening in the end plate C, is preferably turned down to form a shoulder, as indicated at H, Fig. 2, the reduced portion of such casing being journaled in the cylindrical opening in end plate C. Intermediate its ends the cylindrical casing is provided with a series of longitudinal slots J of varying length, as indicated in the development of the cylindrical surface of said casing in Fig. 4, according to the number of days in each month of the year, and each of said longitudinal slots J may correspond with a month of the year, as indicated by the legends at the lower ends of said slots. For instance, thirteen slots J are provided, one for each month of the year except February, which month is provided with two in order to accommodate the twenty-eight days of the ordinary month of February or the twenty-nine days of the month in a leap-year. On the front plate B and adjacent to the longitudinal slot G therein are arranged numbers corresponding to the days of the month. A convenient arrangement, to which, however, I do not desire to be limited or restricted, is shown, in which the odd numbers are on one side of the slot and the even numbers on the other side, thus enabling the slot to be of shorter length without crowding the numbers than is possible otherwise.

K designates a slide arranged to be received in and guided by the front plate B of the receptacle for movement therealong and in coöperative relation with respect to the designations of the days of the month. This slide-plate is provided with openings, (indicated at L,) through which the numbers designating the days of the month on the front plate B may be disclosed when said slide K is brought into proper and suitable register therewith. For instance, as shown in Fig. 1, the slide K is in position to disclose number "1" on the front plate B, corresponding to the first day of a month. The cylindrical casing F, having one end journaled in the opening in the end plate C, is free to be axially revolved, so as to bring any desired slot J therein into register with the slot G in the front plate B, so as to disclose therethrough the name of the month corresponding to the particular slot J of casing F, which has been brought into register with the slot G. The slide K carries a stop device, which may be of any suitable construction and arrangement, the purpose and mode of operation of which will presently be more fully described. In the particular form shown, to which, however, the invention is not to be limited or restricted, this stop device comprises a spring-pressed pin M, having its end arranged to extend through the slots G and J, whichever one of the latter is in register with the slot G, and into the interior of the cylindrical casing a spring or other suitable means, (indicated at N,) serving to normally project or press said pin into said casing, but capable of being withdrawn by hand or otherwise against the action of the spring or other yielding device, as will be apparent. Coins, slugs, or other tokens O are arranged to be received within the cylindrical casing F and may be normally pressed or fed in said casing toward the open end thereof. A convenient arrangement is shown, but to which my invention is not to be limited or restricted, wherein a follower-plate P is arranged within the cylindrical casing F with a spring Q acting thereon and normally tending to press said follower-plate toward the open end of the cylindrical casing, and the coins, slugs, or tokens O are arranged to be received within the cylindrical casing and to rest upon or to be engaged by the follower-plate P and to be forced thereby yieldingly toward the open end of said casing. The follower-plate P may be moved against the action of the spring Q, manually or otherwise, in any convenient manner—as, for instance, by means of a rod or other connection R, connected thereto and extending through the casing and its containing-receptacle, as clearly shown in the drawings. Adjacent to the open end of the cylindrical casing is a slotted plate S, raised above or beyond the open end of the casing and its receptacle a sufficient distance to accommodate a single coin, slug, or token, and against which the column of coins, slugs, or tokens contained in the cylindrical casing is pressed, thereby enabling the first coin, slug, or token of the column to be readily removed from the casing by hand, its place being immediately supplied by the next coin, slug, or token of the column being pressed against the plate S.

The manner of using the device above described is as follows: Suppose a collection is made by an employee of the telephone company at a subscriber's station on the first day of January or that the given period within which a minimum of toll or rental is to be paid begins on the first day of January. The casing F is filled with coins, slugs, or other tokens to its capacity. The pin M of slide K is withdrawn and said slide is permitted to descend until the figure "1" on the front plate B is disclosed through an opening L of said slide, this being the limit of movement of the slide in one direction. The casing F is then axially rotated until the slot J, corresponding to the month of January, is such that thirty-one coins, slugs, or tokens will occupy the space between the point marked "1" on the front plate B and the end of the slot J nearest the open or delivery end of the casing. The pin M is then released or the end thereof projected into the casing F and between adjacent coins, slugs, or tokens opposite such end, as clearly shown in Fig. 2, thereby forming a stop device carried by the column of coins, slugs, or tokens. The subscriber is required to deposit a certain average of coins, slugs, or tokens per day—say, for instance, one each day. When the subscriber desires to make a call, the coin at the end of the column and which is held against the end plate S is removed from the casing and deposited in the coin-controlled apparatus to be operated thereby. Under the influence of the means which press the column of coins or tokens toward the open end of the casing such column is advanced the extent of the coin or token removed, thereby carrying the stop device along with it. The subscriber continues from day to day to remove the coins or tokens from the end of the column and deposit the same in the coin-controlled apparatus, according to his inclination or necessities, the removal of each coin, slug, or token serving to advance the stop device along with the advancing column until finally the stop device or pin M engages the limit of the slot J in which it travels. When this point is reached, it will be seen at a glance that the subscriber has used the coin-controlled apparatus thirty-one times during the month of January, and hence has deposited the minimum amount required to be deposited during that month. It is also evident that if the coin-controlled apparatus is not used on an average of once for each day the position of the stop device along the slot G in the front plate B will disclose to the subscriber that he has not used the coin-controlled apparatus to the extent required for the minimum for which he will be required to pay, thereby enabling the subscriber to use the coin-controlled apparatus within the time limit or period a sufficient number of times to satisfy the minimum requirement. On the other hand, the device will also disclose to the subscriber the fact, if such be the case, that as the expiration of the period or limit of time approaches and he has used the slot-controlled apparatus more lavishly than is necessary or in excess of the general average required to make up the minimum he can be more conservative and careful in using the apparatus during the remaining portion of the time or period without overpaying the amount of the minimum required to be paid as toll or rental for the apparatus. If the coin-controlled apparatus is used a number of times in excess of the number of days in the month of January, for instance, the further use of the chronological monitor will be arrested in the case of the illustration above given when thirty-one coins, slugs, or tokens have been removed, and the further removal of such coins, slugs, or tokens from the casing will be arrested until the stop device is released and permitted to return to its initial position or to a position farther removed from the end of the slot in which it travels. In such case or at the beginning of the following or succeeding month such stop device is returned to its initial position or limit of movement and again projected into the column of coins, slugs, or tokens, and the casing F is axially revolved or rotated so as to bring the next slot J or the slot corresponding to the month of February into register with the slot G in the front plate and the operation continues.

While I have described the apparatus or its operation where one call or use of the coin-controlled apparatus for each day is sufficient, it is obvious that the same principle would apply where the coin-controlled apparatus is required to be used two or more times on an average per day, and while I have described the use of the device in connection with a coin-controlled telephone it is obvious that the device is not to be confined to such use, as it is equally well adapted for use in connection with other coin-controlled machines and in other relations as a chronological monitor.

In the drawings I have shown the device so arranged as that the column of coins, slugs, or the like are pressed upwardly and delivered from the upper end of the cylindrical casing. I do not desire, however, to be limited in this respect and the foregoing description is not so limited.

It will be observed that the device is exceedingly simple in its construction and inexpensive of manufacture. The parts may readily be made of aluminium or other light and cheap material and may be made ornamental or placed in any inconspicuous place, if desired, in convenient position for use. Of course it will be understood that it is not necessary to employ coins of money value, as slugs or other tokens may be employed in lieu thereof, the subscriber settling for the number of times the slot-machine is used, whether such machine be operated by a money coin or a slug or other token.

In order to facilitate access to the cylindrical casing to effect the axial rotation thereof to bring the slots J therein corresponding to the months of the year into registering relation with respect to the slot in the front plate, the sides of the front plate may be beveled or cut away at some convenient point, as indicated at T, Fig. 1, to enable the cylindrical casing F to be grasped between the fingers, and, if desired and in order to prevent lateral displacement of the cylindrical casing within its containing-receptacle, pins or projections W may be employed in the end plate or flange D in such relation with respect to the cylindrical casing as to hold the same in centered position. If desired, a stop V may be employed to limit the position of the slide K when in its initial position, as shown in Fig. 1.

It is obvious that many variations in the details of construction and arrangement would readily suggest themselves to persons skilled in the art and still fall within the spirit and scope of my invention. I do not desire, therefore, to be limited or restricted to the exact details of construction and arrangement shown and described; but, Having now set forth the object and nature of my invention and a construction embodying the principles thereof, what I claim as new and useful and of my own invention, and desire to secure by Letters Patent, is—

1. In a chronological monitor for use in connection with coin-controlled machines and for other purposes, a retainer to receive a column of coins, slugs or tokens, and means for constantly pressing such column toward the delivery end of said retainer, and a stop device mounted for adjustment to various points with reference to the length of such column, as and for the purpose set forth.

2. In an apparatus of the class described, a retainer to receive a column of coins, slugs or tokens, and means for yieldingly pressing said column toward the delivery end of the retainer, in combination with a stop device mounted for adjustment to various points with reference to the length of such column, as and for the purpose set forth.

3. In an apparatus of the class described, a slotted casing adapted to receive a column of coins, slugs or tokens therein, and means normally operating to press said column toward the delivery end of said casing, in combination with a stop device arranged to operate through the slot in said casing and mounted for adjustment to various points with reference to the length of said column, as and for the purpose set forth.

4. In an apparatus of the class described, a casing having slots corresponding in number to the months of the year and of a length varying according to the number of days in each month of the year and adapted to receive a column of coins, slugs or tokens, and means normally operating to press said column toward the delivery end of said casing, in combination with a stop device arranged to operate through a slot of said casing and connected to move with said column, as and for the purpose set forth.

5. In a device of the class described, a cylindrical casing having longitudinal slots therein corresponding to the months of the year, said slots varying in length according to the number of days in each month, said casing adapted to receive a column of coins, slugs, tokens or the like, and means operating to normally press said column toward the delivery end of said casing, in combination with a stop device arranged to be detachably connected to move with the column through a slot of said casing, as and for the purpose set forth.

6. In a device of the class described, a cylindrical casing having longitudinal slots formed therein corresponding in number to the number of months in the year and of a length corresponding to the number of days in each month, said casing arranged to receive a column of coins, slugs or tokens, in combination with a detachable stop device arranged to extend through a slot in said casing for connection with the column to move therewith, said casing being rotarily mounted whereby it may be brought into position to register any one of the slots with said locking device, as and for the purpose set forth.

7. In an apparatus of the class described, a casing arranged to receive coins, slugs or tokens, means operating to normally press said coins, slugs or tokens toward the delivery end of said casing, a stop device mounted for adjustment to various points with reference to the length of said coins, slugs or tokens, and a guide for said stop device, as and for the purpose set forth.

8. In a device of the class described, a casing to receive coins, slugs or tokens, means operating to normally press said coins, slugs or tokens toward the delivery end of said casing, in combination with a stop device arranged to be detachably connected to move with said coins, slugs or tokens, and means coöperating therewith to arrest the movement of said coins, slugs or tokens upon attaining a limit of movement, as and for the purpose set forth.

9. In a device of the class described, a casing to receive coins, slugs or tokens, means operating to normally press said coins, slugs or tokens toward the delivery end of said casing, in combination with a stop device arranged to be detachably connected to move with said coins, slugs or tokens, means coöperating therewith to arrest the movement of said coins, slugs or tokens upon attaining a limit of movement, and a guide for said stop device, as and for the purpose set forth.

10. In a device of the class described, a frame forming a receptacle, a casing mounted in said frame and adapted to receive a column of coins, slugs or tokens, means for normally pressing said column toward the delivery end of said casing, and a stop device mounted to slide upon said frame and adjustable to various points with reference to the length of said column, as and for the purpose set forth.

11. In a device of the class described, a frame forming a receptacle, a slotted casing mounted in said frame and adapted to receive a column of coins, slugs or tokens, means operating to normally press said column toward the delivery end of said casing, and a stop device mounted to slide upon said frame and arranged to be detachably projected through the slot in said casing for connection to move with said column, as and for the purpose set forth.

12. In a device of the class described, a front plate having lateral extensions forming a receptacle, a casing mounted to revolve in said receptacle and adapted to receive a column of coins, slugs or tokens, and means for moving said column toward the delivery end of said casing, in combination with a stop device connected to move with said column, and means arranged to be engaged by said stop for arresting the movement of said column at predetermined points, as and for the purpose set forth.

13. In a device of the class described, a front plate having lateral end extensions, a cylindrical casing supported at one end upon one of said end extensions and at the other end journaled in the other of said end extensions, said casing adapted to receive a column of coins, slugs or tokens, and a stop device connected to move with said column, and means coöperating with said stop device for arresting the movement of said column, as and for the purpose set forth.

14. In a device of the class described, a plate having end extensions forming a receptacle, in combination with a cylindrical casing received in said receptacle and having one end journaled in one of said end extensions, said casing adapted to receive a column of coins, slugs or tokens, and means operating to normally press said column toward the delivery end of said casing, as and for the purpose set forth.

15. In a device of the class described, a casing to receive a column of coins, slugs or tokens, a follower arranged in said casing, means operating to normally press said follower toward one end of said casing to move said column toward such end, in combination with a stop device arranged to be detachably connected to said column to move therewith, and means coöperating with said stop device for arresting the movement thereof at predetermined limits, as and for the purpose set forth.

16. In a device of the class described, the combination with a front plate graduated according to the number of days contained in a month, a slide operating along said plate, a casing adapted to receive a column of coins, slugs or tokens, said casing having longitudinal slots corresponding in number to the number of months in the year, said slots varying in length according to the number of days in each month, and a detachable stop device carried by said slide and arranged to project through a slot in said casing for connection with said column to move therewith, as and for the purpose set forth.

17. In a device of the class described, a front plate having graduations corresponding to the number of days in a month, a slide coöperating therewith, a casing rotarily mounted and having longitudinal slots corresponding in number to the number of months in a year, said slots varying in length according to the number of days in each month, and a stop device carried by said slide and arranged to be detachably projected through a slot in said casing for connection to move with said column, as and for the purpose set forth.

18. In a device of the class described, a base-plate, a front plate having angular end extensions connected to said base-plate and forming a receptacle, a cylindrical casing arranged to be received in said receptacle, said front plate being longitudinally slotted, a slide mounted to move upon said front plate, said casing being longitudinally slotted and adapted to receive therein a column of coins, slugs or tokens, means operating to normally press said column toward the delivery end of said casing, a delivery-plate arranged adjacent the open or delivery end of said casing, and a stop device operating through a slot in said casing for connection to move with said column whereby when said stop device reaches the limit of the slot through which it operates, further movement of said column toward the delivery end of the casing is arrested, as and for the purpose set forth.

19. In a device of the class described, a casing adapted to receive a column of coins, slugs or tokens, said casing being slotted longitudinally, the column of coins, slugs or tokens and said casing being relatively movable, and means adjustably mounted with reference to the length of such column to indicate the extent of such relative movement, as and for the purpose set forth.

20. In a device of the class described, a casing having longitudinal slots corresponding to the months of the year and varying in length according to the number of days contained in a month, said casing adapted to receive a column of coins, slugs or tokens, in combination with a plate graduated according to the number of days in a month, the coins, slugs or tokens being movable in said casing, and means arranged to move with the column of coins, slugs or tokens and coöperating with the graduations of said plate, said means being arrested at the extremity of the slot corresponding to a selected month, as and for the purpose set forth.

21. In a device of the class described, a retainer to receive a column of coins, slugs or tokens, means for constantly maintaining a coin or token at the delivery end of said retainer, and an adjustable stop device associated with the column of coins, slugs or tokens and operating to variably arrest the delivery of said coins, slugs or tokens, as and for the purpose set forth.

22. In an apparatus of the class described, a retainer to receive a column of coins, slugs or tokens, means for constantly maintaining the column of coins, slugs or tokens pressed toward the delivery end of said retainer, in combination with an indicating device to indicate the removal of coins or slugs from or the insertion of same in said retainer, said indicating device being adjustable to variable points with reference to the column of coins, slugs or tokens, as and for the purpose set forth.

23. In an apparatus of the class described, a retainer to receive a column of coins, slugs or tokens, the latter being removable therefrom, in combination with a stop device mounted for adjustment to various points in the length of said column and operating to indicate the extent of removal of coins, slugs or tokens from said retainer, as and for the purpose set forth.

In witness whereof I have hereunto set my hand, this 28th day of September, 1903, in the presence of the subscribing witnesses.

FRED P. GORIN.

Witnesses:
CHAS. H. SEEM,
S. E. DARBY.